May 17, 1949.  J. BERGMANS ET AL  2,470,284
BAR SYSTEM AND LAMP FITTING COMPRISING
SUCH BAR SYSTEMS
Filed April 25, 1946  2 Sheets-Sheet 1
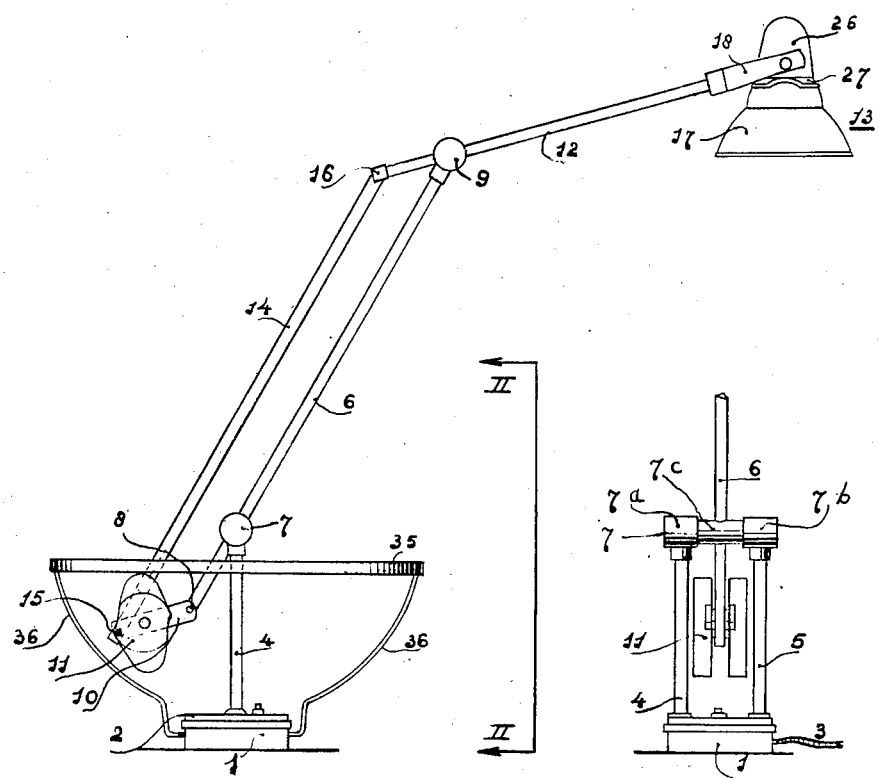
INVENTORS
JAN BERGMANS
CLAMOR AUGUST LAMBERTS
CHARLES HENRI JOSEPH ANDERSON
BY
ATTORNEY

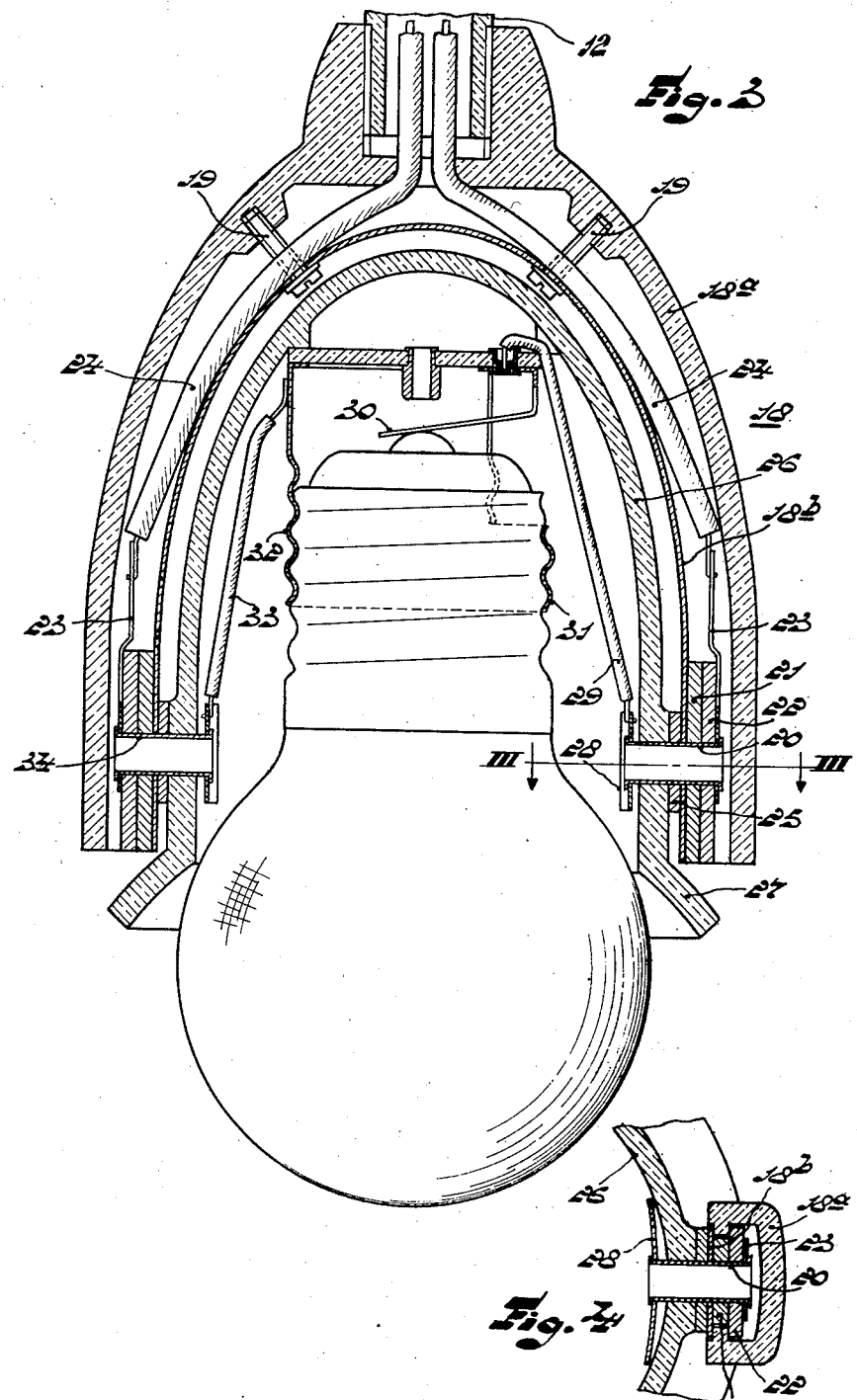

Patented May 17, 1949

2,470,284

UNITED STATES PATENT OFFICE 2,470,284

BAR SYSTEM AND LAMP FITTING COMPRISING SUCH A BAR SYSTEM

Jan Bergmans, Clamor August Lamberts, and Charles Henri Joseph Anderson, Eindhoven, Netherlands, assignors, by mesne assignments, to Hartford National Bank and Trust Company, Hartford, Conn., as trustee Application April 25, 1946, Serial No. 664,726
In the Netherlands September 10, 1942

Section 1, Public Law 690, August 8, 1946
Patent expires September 10, 1962

2 Claims. (Cl. 248—280)

This invention relates to a bar system comprising a bar, which is hinged to a support, and two further bars which on either side of the hinge of the first bar secured to the support are also hinged to the first bar and are so interconnected as to steadily extend parallel with each other, one of these bars having secured to it an element, such as a lamp, a lamp holder, a microphone or the like, which is adjustable within wide limits with respect to the support and operated with electrical energy, and which is balanced in every position by means of a counterpoise secured to the other of the two bars. Such bar systems, which have already come to be known, are advantageous where it is required or desired to make an element, which is to be operated with electrical energy, adjustable within wide limits with respect to the support in such manner that the element is balanced in every position. The common bar systems of this kind are usually made from steel tubes, due to which the balanced part of the bar system is heavy and consequently a heavy counterpoise is required. This is not contributive to an easy manipulation of such a bar system; it requires fairly much exertion to bring the element operated with electrical energy from one position to another. On the other hand the range of the bar system is usually not made large, since an increase in range requires a heavier counterpoise. In these common constructions the total weight of the bar system is such that the construction of such a bar system with a lamp which is adjustable within wide limits with respect to the support, for instance a table lamp movable as a whole, is not inviting.

The present invention meets all these drawbacks.

The lever system according to the invention exhibits the feature that the weight of the bar secured to the support and of the bar having secured to it the element adjustable within wide limits, inclusive of the electric conductors extending in or along the bars, is at the utmost 200 gms. per running metre and the ratio between the distances of the center of gravity of the element adjustable within wide limits and the center of gravity respectively of the counterpoise to the center of rotation in the support of the bar secured to this support in the most extended position of the bar system amounts to at least 3, 5 against 1.

When keeping the weight of the said bars, inclusive of the electric conductors extending therein and along them respectively, below the abovementioned limit, a comparatively light counterpoise can be used, as a result of which on the one hand the displacement of the element adjustable within wide limits relatively to the support, and on the other hand the displacement of the bar system as a whole requires little exertion. Furthermore the range of the bar system may be large without bringing the counterpoise at a comparatively great distance from the support, which is highly contributive to the usefulness of the bar system. The easy manipulation of the whole, more particularly the small weight, is particularly advantageous when, according to a suitable embodiment of the invention, a lamp fitting designed to be displaced as a whole, is equipped with such a system of bars in order to act as a support for a lamp holder.

Another progress of the invention consists in that the weight of the element, adjustable within wide limits with respect to the support, has a maximum weight of 5000 gms.

According to the invention, in a bar system having tubular bars, it is advisable that the hollow hinges containing the electric conductors should consist of insulating material. In fact, the conductors are most liable to deterioration at the hinges.

As a material for the bars of the bar system aluminum and synthetic resin moulding materials, for instance, enter into account in view of the above limit. The last-mentioned materials have the advantage over the first-mentioned material of permitting a convenient thickness of the wall despite a small weight per running metre. Moreover, they have insulating properties. When the bars are made from metal, thin-walled drawn aluminum tubes, for instance, enter into account.

It is advantageous to make at least the bars containing the conductors from fibrous material, which is soaked with synthetic resin, rolled up and moulded into the form of a tube. These bars may be provided at their ends with a screw thread which is preferably also obtained by moulding. This material has the advantage of being robust and elastic.

When, according to one embodiment of the invention, the parts of the hinges are screwed into each other the advantage is obtained that this screw thread has so much friction that the bar system is balanced both in regard to a light element adjustable within wide limits and in regard to such an element having a larger weight. This advantage is particularly manifest when, in a lamp fitting furnished with such a bar system, a lamp having a definite power is replaced by a lamp having a different power. These lamps will have different weights. If the friction in the screw thread should be insufficient it may be increased by a pressing together of the co-operating flanks of the screw thread, for instance by means of a spring which may be adjustable.

In the bar system according to the invention, more particularly in a lamp fitting of this kind, means may, in one embodiment of the invention, be provided which indicate the maximum required profile of free space for the counterpoise. Such means are advantageous when arranging such a bar system or such a lamp on a plane, in whose proximity there are obstacles which the counterpoise might touch in operating the bar system. If such means are available one may be sure that in manoeuvring the bar system, the counterpoise will always be clear from such obstacles. These means may, for instance, consist of a ring or the like secured to the support of the bar system.

The invention will be more fully explained by reference to the accompanying drawings representing, by way of example, one form of construction of the bar system according to the invention.

Fig. 1 is a side view of a table lamp comprising a bar system according to the invention.

Fig. 2 is a side view according to the arrows II—II shown in Fig. 1 of the lower part of the lamp shown in Fig. 1.

Fig. 3 is a sectional view of the construction of the lamp holder, of the fork carrying this lamp holder and of the associated parts.

Fig. 4 is a section of a detail of the construction shown in Fig. 3 on the line III—III in this figure.

The lamp fitting shown in Figures 1 and 2 and realized as a table lamp, comprises a base 1 in which end the conductors 3 and on which the part 2 of the base is able to turn freely. The base 1 and the upper part 2 comprise cooperating sliding contacts which establish the connection between the conductors 3 and the conductors (not represented) contained in the hollow tubular bars 4 and 5 placed on the part 2. The bars 4 and 5 act as a support for the hollow tubular bar 6 which is connected to the support 4—5 by means of the hinge 7. At both ends of the bar 6 are provided hinges 8 and 9; the bar 10 carrying the counterpoise 11 is hinged to the bar 6 by means of the articulation 8. Furthermore the tubular hollow bar 12 is hinged to the bar 6 by means of the articulation 9. The said bar 12 carries the element 13, which is adjustable within wide limits with respect to the support 4—5, and in the present case comprises the lamp holder with the hood 26, the fork 18 and the reflector 17. As a result of the connecting bar 14, which is hinged to the bar 10 at 15 and to the bar 12 at 16, extend steadily parallel to each other. Owing to the fact that the weight of bars 6 and 12 amounts to about 60 gms. per running metre and that of the pair of conductors contained therein is about 30 gms. per running metre (i. e. in total 90 gms. per running metre) and the weight of the lamp holder with the associated hood, fork and lamp only amounts to about 125 gms., whilst the length of the bar 6 between the hinges 7 and 9 is about 42 cms. and that of the bar 12 between the hinges 9 and 17 is about 35 cms., a counterpoise 11 of about 1200 gms. is sufficient. Consequently the manipulation of this fitting is very easy and the adjustable element has a very large range. In the fully extended position of the fitting the ratio of the distance (±80 cms.) between the center of gravity Z of the adjustable element 13 and the center of rotation 7 on the one hand, and the distance of the center of gravity of the counterpoise 11 to the center of gravity 7 on the other hand, to about 5.5 to 1.

In this construction the bars 6, 12 and 14 as well as the bars 4 and 5 are made from fibrous material which is soaked with synthetic resin, rolled up and moulded into the form of a tube. The ends of these bars are provided with a moulded screw thread by means of which the corresponding hinge part are secured to these bars. Thus, for instance, the hinge 7 consists of the two outer halves 7a and 7b, whose cross ends exhibit an aperture provided with a moulded screw thread. The part 7c of this hinge, in which is secured the bar 6, is provided at both ends with a screwthread which cooperates with that of the parts 7a and 7b.

Owing to the friction incurred in this screw joint (and also at the other centers of rotation) the bar system and also the counterpoise 11 are adapted for use in combination with an adjustable element that may have a variable weight.

As shown in Fig. 1, the end of the bar 12 has secured to it a fork 18 whose construction appears from Figures 3 and 4. The fork 18 essentially consists of two parts, viz. of the part 18a moulded in one piece from synthetic resin, which has a U-shaped cross-section as appears more particularly from Fig. 4, and of the part 18b which consists of a horse-shoe strip and closes the aperture between the two limbs of the U-shaped cross-section of the part 18a. The parts 18a and 18b are secured together by means of the studs 19. In the part 18b are secured the hollow pins 20 with the interposition of several presser plates 21 and 22. The pin is flanged at both ends and bears with one flanged end on a metal strip 23 located in the cavity of the fork. One of the two supply conductors 24 is soldered to the end of this strip. The part of the hollow pin 20 projecting from the cavity of the fork carries, with the interposition of a filling plate 25, the hood 26 of insulating material, and between the flanged end of the pin 20 at this point is provided a springy metal strip 28 to which is secured the supply conductor 29. The latter leads to the central contact 30 of a lamp holder 31 fitted in the hood 26. The shell contact 32 of this lamp holder is connected through the intermediary of the conductor 33, to the hollow pin 34, which is realized and mounted similarly to pin 20. At the bottom side of the hood 26 is provided a rim 27 to which the reflector may be secured.

The lamp holder 31 with the hood holder 26 can be turned about the joint pins 20 and 34 which act as supply members. Moreover, the represented fork is able to rotate, by means of a screwthread, at the end of bar 12. These possibilities of motion together with those offered by the hinges 9 and 7, as well as the rotary positioning of the part 2 with respect to the base 1 make that the element 13 is adjustable with respect to the support within very wide limits. Fig. 1 represents schematically a ring 35 which is secured to the base 1 by means of supports 36 and indicates the maximum required profile of free space for the counterpoise.

The base shown in Figures 1 and 2 may, for instance, also be mounted to a wall so that the fitting has the character of a wall bracket. The supports 4—5 may also have another shape. Thus, for instance, the part 7c of the hinge 7 may be imagined to turn in one or two hinge parts 7a and 7b that are directly mounted on a base.

It will be appreciated that the element 13 may be a lamp holder or a lamp and, in addition, a microphone or another element to be operated with electrical energy.

What we claim is:

1. Apparatus for supporting an electrical element in a given position with respect to a base, comprising a pantograph-like framework member having interconnected arm portions and hollow insulating hinge portions, a counterpoise member, a rotatable support member, adjustable means for rockably supporting the said element, and circuit means for conducting current to the said element, said members being connected together to form a balanced rotatable structure, said circuit means being entirely concealed in said connected structure and said element.

2. Apparatus for supporting an electrical element in a given position with respect to a base, comprising a pantograph-like framework member of rods and tubular portions, hollow threaded insulating hinge connecting portions for connecting said framework portions, an equipoise member, a rotatable support member, adjustable insulating means for rockably supporting the said element, and circuit means substantially entirely enclosed within certain hinged portions and certain of the said tubular members for conducting current to the said element, said members being secured together to form a balanced rotatable structure, the said members concealing portions of the circuit means being made of fibrous material, said fibrous material being soaked with synthetic resin, rolled up and moulded into said tubular portion.

JAN BERGMANS.
CLAMOR AUGUST LAMBERTS.
CHARLES HENRI JOSEPH ANDERSON.

REFERENCES CITED

The following references are of record in the file of this patent:

UNITED STATES PATENTS

| Number | Name | Date |
|---|---|---|
| 2,100,241 | Cunningham | Nov. 23, 1937 |

FOREIGN PATENTS

| Number | Country | Date |
|---|---|---|
| 21,188/35 | Australia | Feb. 5, 1935 |